(12) United States Patent
Asada et al.

(10) Patent No.: US 9,354,303 B2
(45) Date of Patent: May 31, 2016

(54) SIGNAL PROCESSING DEVICE, RADAR APPARATUS, TARGET OBJECT METHOD

(71) Applicant: Furuno Electric Co., Ltd., Nishinomiya (JP)

(72) Inventors: Yasunobu Asada, Nishinomiya (JP); Akira Okunishi, Nishinomiya (JP); Koji Dai, Nishinomiya (JP); Sae Takemoto, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 378 days.

(21) Appl. No.: 14/015,862

(22) Filed: Aug. 30, 2013

(65) Prior Publication Data
US 2014/0062760 A1    Mar. 6, 2014

(30) Foreign Application Priority Data

Sep. 5, 2012  (JP) ................................ 2012-195154

(51) Int. Cl.
*G01S 13/93*    (2006.01)
*G01S 13/50*    (2006.01)
(Continued)

(52) U.S. Cl.
CPC ........... *G01S 13/505* (2013.01); *G01S 13/5242* (2013.01); *G01S 13/582* (2013.01)

(58) Field of Classification Search
CPC . G01S 13/9307; G01S 13/106; G01S 13/505; B63B 43/18
USPC .................................. 342/41, 127, 133, 144
See application file for complete search history.

(56) References Cited

U.S. PATENT DOCUMENTS 5,065,161 A * 11/1991 Shibutani .................. G01S 7/22
                                                          342/176
5,559,517 A *  9/1996 Didomizio .......... G01S 13/5242
                                                          342/156

(Continued)

FOREIGN PATENT DOCUMENTS

| JP | 10197627 A   | 7/1998 |
| JP | 2003149327 B2 | 5/2003 |
| WO | 2009027718 A1 | 3/2009 |

OTHER PUBLICATIONS

Yoshita, Takashi, "Radar Technology", Institute of Electronics, Information and Communication Engineers, Chapter No. 8, pp. 212-219, Oct. 1996.

*Primary Examiner* — John B Sotomayor
*Assistant Examiner* — Marcus Windrich
(74) *Attorney, Agent, or Firm* — Alleman Hall McCoy Russell & Tuttle LLP (57) ABSTRACT

A signal processing device is provided. The device includes an echo signal input unit for receiving echo signals resulted from transmission signals reflected on an object. The transmission signals are transmitted from a transmission source at transmission timings at predetermined time intervals, at least one of the transmission timings shifted from the other timings in time. The device includes a complex reception signal generator for generating complex reception signals, a phase calculator for calculating a phase change amount of the complex reception signals with respect to a reference phase, a phase corrector for phase-correcting the complex reception signals and outputting the corrected signals, and a Doppler processor for performing Doppler processing on the corrected signals and outputting the Doppler-processed signals as Doppler echo signals of the object.

19 Claims, 8 Drawing Sheets

(51) Int. Cl.
*G01S 13/524* (2006.01)
*G01S 13/58* (2006.01)

(56) References Cited

U.S. PATENT DOCUMENTS

| | | | |
|---|---|---|---|
| 5,805,101 A * | 9/1998 | Bodenmueller | G01S 7/411 342/21 |
| 7,710,309 B2 * | 5/2010 | Kao | G08G 3/02 342/41 |
| 7,956,798 B2 * | 6/2011 | Yanagi | G01S 7/064 342/137 |
| 8,423,278 B2 * | 4/2013 | Kondo | B63B 49/00 342/176 |
| 2009/0219189 A1 * | 9/2009 | Bateman | G01S 7/06 342/30 |
| 2009/0315756 A1 * | 12/2009 | Imazu | B63B 49/00 342/41 |
| 2010/0188290 A1 * | 7/2010 | Vacanti | G01S 13/5242 342/385 |
| 2010/0214151 A1 * | 8/2010 | Kojima | G01S 13/5244 342/28 |
| 2010/0289690 A1 * | 11/2010 | Dai | G01S 7/062 342/41 |

* cited by examiner

SIGNAL PROCESSING DEVICE, RADAR APPARATUS, TARGET OBJECT METHOD

CROSS-REFERENCE TO RELATED APPLICATION(s)

The application claims priority under 35 U.S.C. §119 to Japanese Patent Application No. 2012-195154, which was filed on Sep. 5, 2012, the entire disclosure of which is hereby incorporated by reference.

TECHNICAL FIELD

The present invention generally relates to a signal processing device for processing an echo signal in a detection apparatus, such as a radar apparatus, the radar apparatus for detecting a target object by transceiving an electromagnetic wave, and a method of processing a signal in these device and apparatus. The signal processing device and method of the present invention are particularly applied to the detection apparatus, such as the radar apparatus, using a staggered trigger scheme.

BACKGROUND OF THE INVENTION

Radar apparatuses detect target objects (e.g., aircrafts and ships) generally by transmitting pulses of electromagnetic waves from antennas and receiving reflection waves from the target objects from the antennas. There are cases where reflective bodies which generate sea and rain clutter and the like (unnecessary reflection wave) exist around the target objects to be detected. JP1998-197627A and "Revised Radar Technique" (supervised by Takashi Yoshida, Institute of Electronics, Information and Communication Engineers, 1996, p. 217) disclose Doppler processing for suppressing clutter.

The reflection waves from the target objects received by the antennas of the radar apparatuses are normally sampled at an equal interval for every transmission azimuth of the electromagnetic wave. In the Doppler processing, data obtained by converting the reflection waves (echo signals) from the target objects is used to perform Discrete Fourier Transform (DFT) or Fast Fourier Transform (FFT) in order to obtain a Doppler spectrum. The digitalized echo signal is decomposed into a plurality of sub-bands by a filter bank (multiple Doppler filters) relating to a Doppler shifted frequency. Data outputted from each sub-band is Constant False Alarm Rate (CFAR) processed and then is combined with each other.

Meanwhile, there is a case where a radar apparatus equipped in a ship (referred to as "the ship") receives an influence due to an electromagnetic wave outputted from another radar apparatus which is equipped in a ship existing around the ship (the ship equipped with the other radar apparatus is referred to as "the other ship"), and mutual interference occurs between the radar apparatuses.

As one of means for suppressing the influence of mutual interference between the radar apparatuses, JP3561497B discloses a staggered trigger scheme. The staggered trigger scheme is a scheme in which processing of changing a transmission interval of repeatedly transmitting the pulse signal (stagger processing) is applied. By performing the stagger processing, it can be avoided that a reception timing of an echo signal from a target object caused by a pulse signal transmitted by a radar apparatus matches with a reception timing of a pulse signal transmitted by another radar apparatus between sweeps. If the reception timings do not match between sweeps, the echo signal from the target object can be discriminated from the transmission signal caused by the radar apparatus of the other ship based on the reception signals in the plurality of sweeps.

However, in the case where the stagger processing is performed in the radar apparatus to which the Doppler processing is applied, if a relative speed of the other ship with respect to the ship increases, a signal-to-clutter ratio (S/C) and a signal-to-noise ratio (S/N) may not be able to improve as sufficiently as expected in the Doppler processing, due to the influence of the stagger processing.

SUMMARY OF THE INVENTION

The present invention is made in view of the above situation, and aims to provide a device that can improve S/C and S/N by Doppler processing even in a detection apparatus, such as a radar apparatus adopting a staggered trigger scheme.

According to one aspect of the present invention, a signal processing device is provided. The device includes an echo signal input unit for receiving echo signals resulted from transmission signals (pulse signals) reflected on an object, the transmission signals transmitted from a transmission source (e.g., antenna) of the pulse signals at transmission timings at predetermined time intervals, at least one of the transmission timings shifted from the other timings in time. The device also includes a complex reception signal generator for generating complex reception signals based on the echo signals. The device also includes a phase calculator for calculating a phase change amount of the complex reception signals with respect to a reference phase based on a moving speed of the transmission source and a lapsed period of time from a reference timing. The device also includes a phase corrector for phase-correcting the complex reception signals based on the phase change amount and outputting the corrected complex reception signals. The device also includes a Doppler processor for performing Doppler processing on the corrected complex reception signals and outputting the Doppler-processed complex reception signals as Doppler echo signals of the object.

Here, the calculation of the phase change amount by the phase calculator may be based only on the moving speed when the transmission source is in move. Alternatively, the phase change amount may be calculated by calculating a relative speed of the specific object detected in advance with respect to the transmission source based on a moving speed of the specific object and the moving speed of the transmission source. A phase correction can be performed at higher accuracy in the later method. In the later case, the moving speed of the specific object is required. This moving speed can be obtained by calculating a Doppler speed once and using the result, for example.

Moreover, in this aspect of the present invention, under a condition that the stagger processing is applied, the phase change amount based on a shifted amount from a transmission timing based on a predetermined cycle of the transmitted pulse signal. The Doppler processing is performed by taking the phase change amount into consideration. The Doppler processing is performed on the complex reception signals obtained based on the staggered trigger repetitively pulsed signals, and thus, the phase error due to both the relative speed of the specific object and the stagger processing can be removed mostly.

According to the present invention, in the Doppler processing in, for example, a radar apparatus adopting the starred trigger scheme, interruption of improvements in S/C and S/N due to the interval of the transception of the pulse signal being unequal between sweeps can be reduced.

BRIEF DESCRIPTION OF THE DRAWINGS

The present disclosure is illustrated by way of example and not by way of limitation in the figures of the accompanying drawings, in which the like reference numeral indicate like elements and in which:

FIG. 4 is a schematic view showing a relation among a speed element of a ship in an antenna azimuth and an antenna azimuth angle, and the like;

DETAILED DESCRIPTION (1) Analyzation of Problems

The present inventors have noticed that when stagger processing is performed in a detection apparatus, such as a radar apparatus set to perform Doppler processing, improvements of S/C and S/N that should originally be obtained by the Doppler processing cannot be achieved sufficiently. Therefore, the present inventors have discussed about the cause thereof first, and successfully determined the cause. Hereinafter, the description is given about the analyzation of the problems.

When two processing of the Doppler processing and stagger processing are applied to one radar apparatus equipped in a ship concerned, there will be a concern of interrupting improvements of the signal-to-clutter ratio (S/C) and the signal-to-noise ratio (S/N) in the Doppler processing as a relative speed of another ship with respect to the ship concerned increases. First, the description is given about an influence on the Doppler processing by the stagger processing with reference to FIGS. 1, 2A and 2B.

Figure 1:
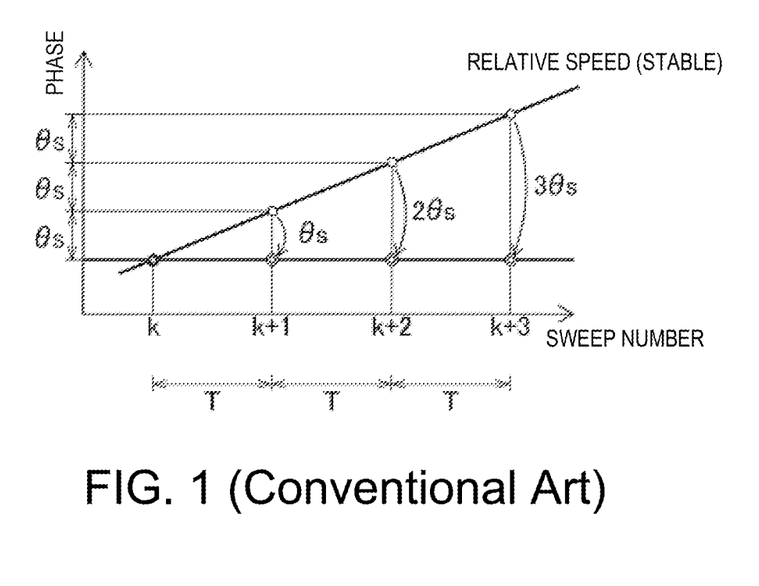
FIG. 1 is a chart for describing an influence of stagger processing on Doppler processing.

In FIG. 1, the horizontal axis indicates a sweep number corresponding to a transmission order of a transmission wave transmitted at a predetermined time interval (transmission interval), and the vertical axis indicates a phase of a data reception signal. A sweep corresponds to the reception signal (echo signal) caused by each transmission wave (pulse signal) and, thus, the horizontal axis is equivalent to a time axis, indicating that time elapses more as the sweep number becomes larger.

The example shown in FIG. 1 is provided under a condition that the transmission interval of the pulse signal which is transmitted from the radar apparatus is fixed and a relative speed of the target object with respect to the ship concerned is stable. In this state, as indicated by the circles in FIG. 1, since the sweep interval is fixed and the relative speed of the target object with respect to the ship concerned is stable, a phase change amount Os between sweeps is also stable. If the relative speed is zero, the phase change amount between sweeps is zero. Thus, an inclination of the chart showing the phase change with lapse of time is zero and it increases as the relative speed increases.

Therefore, when the relative speed is found out, the phase change amount can be found, and by performing a fixed phase rotation on the echo signal, the phases of the echo signals corresponding to sweeps can be matched with each other. For example, as indicated by the double circles in FIG. 1, the phases can be matched among all the sweeps when the phase rotations are performed such that the phase is rotated by 0 degrees at a sweep number k, θs degrees at a sweep number k+1, 2θs degrees at a sweep number k+2, and 3θs degrees at a sweep number k+3. As a result, by adding data after performing the phase rotations, the gain of the echo signal can be maximized.

Figure 2A:
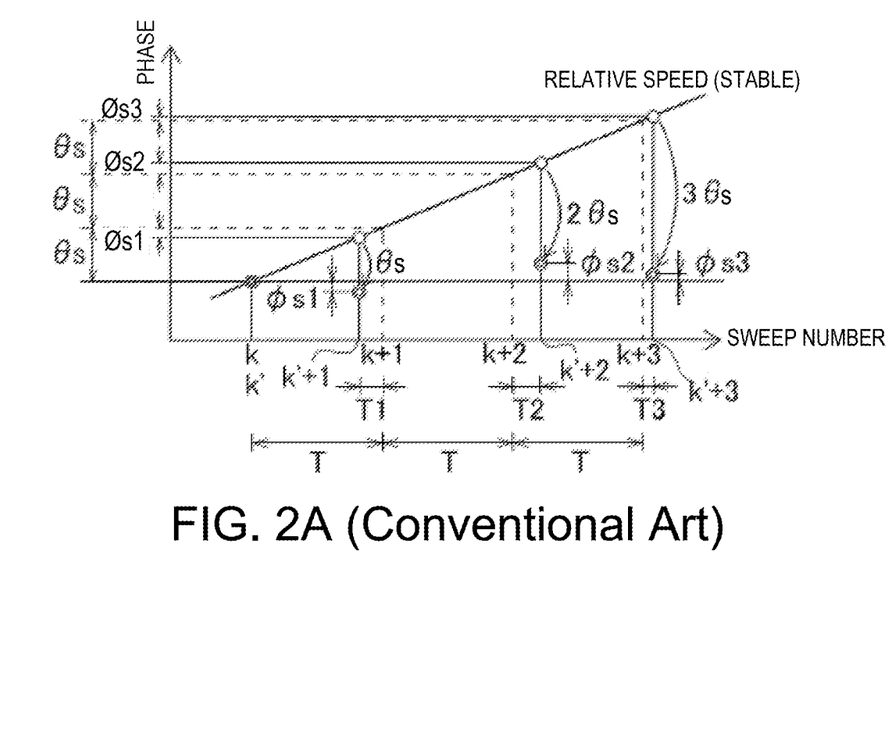
FIG. 2A is a chart for describing a phase error caused by the stagger processing in a case where a speed of a target object is slow.
Figure 2B:
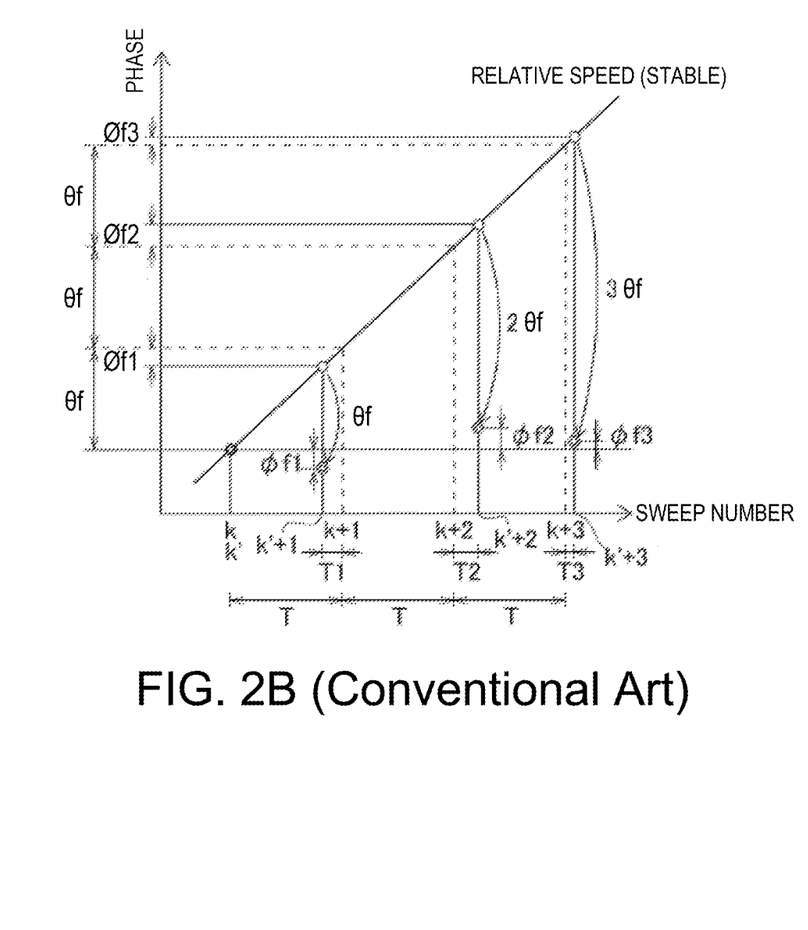
FIG. 2B is a chart for describing a phase error caused by the stagger processing in a case where the speed of the target object is fast.

On the other hand, FIGS. 2A and 2B both show a phase change amount and a phase difference between sweeps in the case where the stagger processing is performed. In FIGS. 2A and 2B, each broken line indicates the phase change amount for the sweep interval when the transmission interval is equal, and in this embodiment, is drawn at each of positions corresponding to sweep numbers k, k+1, k+2 and k+3 in FIGS. 2A and 2B.

When the Doppler processing is performed on data based on an echo signal caused by a staggered pulse signal, as indicated by the single-circles in FIG. 2A, the phase change amount at each sweep is not fixed. The result is the same for the case where the relative speed is stable unless it is zero.

In FIG. 2A, each data at each of sweep numbers k', k'+1, k'+2 and k'+3 is from the staggered pulse signal. Each double circle in FIG. 2A indicates an error of the phase change amount (phase error) caused by each transmission timing due to changing the transmission interval by the stagger processing. For example, from the sweep number k' to the sweep number k'+1, there is a relative speed, and thus, the phase changes by the amount of θs, and when the stagger processing is performed, a phase error of φs1 will be caused thereon. Similarly, from the sweep number k'+1 to the sweep number k'+2, the phase changes by θs, and the phase error of φs2 with respect to the sweep number k' is caused thereon upon performing the stagger processing.

Here, when comparing the sampling interval between the sweep numbers k and k+1 with the sampling interval between the sweep numbers k' and k'+1, the sampling interval between the sweep numbers k' and k'+1 is shorter by a period of time T1. Therefore, when the phase rotates by θs according to the sampling interval between the sweep numbers k and k+1 corresponding to the sweep interval in the case where the transmission interval is equal, the phase over rotates by φs1 for the sampling interval between the sweep numbers k' and k'+1.

On the other hand, when comparing a sampling interval between the sweep numbers k and k+2 with a sampling interval between the sweep numbers k' and k'+2, the sampling interval between the sweep numbers k' and k'+2 is longer by a period of time T2. Therefore, when the phase rotates by 2θs according to the sampling interval between the sweep numbers k and k+2 corresponding to the sweep interval in the case where the transmission interval is equal, the phase rotates insufficiently by øs2 for the sampling interval between the sweep numbers k' and k'+2.

When the predetermined amounts of phase rotations are performed on the staggered sampling data at the sweep number k', k'+1, k'+2 and k'+3 as described above, the phase cannot be matched among all the sweeps, causing phase differences (øs1, øs2 and øs3) as a result. Therefore, even when the data after these phase rotations thereon is added, the maximum gain cannot be obtained.

FIGS. 2A and 2B show cases with different relative speeds of the target object with respect to the ship concerned. When comparing between these cases, the rotation by the phase Of corresponding to the target object shown in FIG. 2B in which the speed of the target object is faster is larger than that by the phase Os corresponding to the target object shown in FIG. 2A. In other words, the phase change amount shown in FIG. 2B is larger than that shown in FIG. 2A with the same transmission interval, and thus, it can be understood that the target object shown in FIG. 2B is moving faster.

The phase errors caused in the staggered sampling data at the sweep numbers k', k'+1, k'+2 and k'+3 tend to increase according to the increase of the relative speed. Thus, the phase errors (øf1, øf2 and øf3) in FIG. 2B are larger than the phase errors (øs1, øs2 and øs3) in FIG. 2A. If the Doppler processing is performed with such phase errors (øf1, øf2 and øf3) and (øs1, øs2 and øs3), the signal-to-clutter ratio (S/C) and the signal-to-noise ratio (S/N) will be interrupted from improving.

The specific method of avoiding the interruption of the improvements of the S/C and S/N due to the Doppler processing will be described after the description of an embodiment of the radar apparatus.

(2) Configuration of Radar Apparatus

The radar apparatus of one embodiment is described with reference to the accompanying drawings. Here, a ship radar apparatus is described as an example of the application of the radar apparatus. The present invention can be applied to radar apparatuses which transmit pulse signals and then receive echo signals from target object(s). For example, it can also be applied to radar apparatuses for different usage, for example, a harbor surveillance radar.

Figure 3:
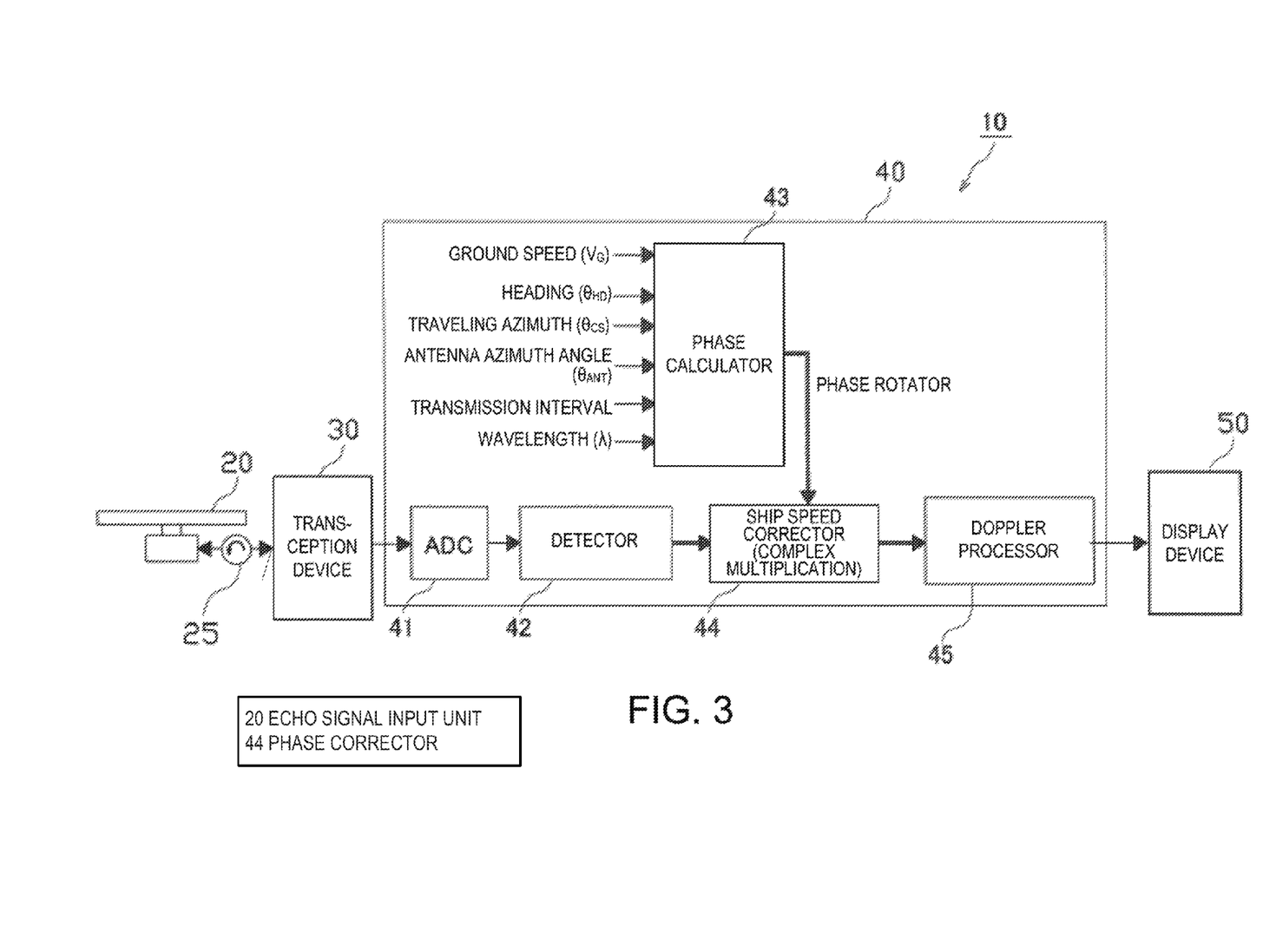
FIG. 3 is a schematic block diagram showing a configuration of a radar apparatus according to one embodiment of the present invention.

FIG. 3 is a block diagram showing a configuration of the ship radar apparatus 10 of this embodiment of the present invention. The radar apparatus 10 of this embodiment is equipped in a ship (hereinafter, may be referred to as "the ship" or "the ship concerned") and detects a target object (e.g., another ship, buoy on the sea, or a land). The radar apparatus 10 includes a radar antenna 20, a transception switch 25, a transception device 30, a signal processing device 40, and a display device 50.

[Configuration of Radar Antenna 20 and Transception Switch 25]

In the radar apparatus 10, the radar antenna 20 transmits a beam of a pulse signal beam having a narrow directivity, and receives a reflection wave from a target object around the antenna. The beam width is set to 2 degrees, for example. The radar antenna 20 is, for example, installed above a hull of the ship, and repeats the transmission and reception while rotating in a horizontal plane. The rotation speed is 24 rpm, for example. A unit of processing performed while the radar antenna 20 rotates once (e.g., 360 degrees) is referred to as one scan. The operation of transmission and reception in a period of time from a transmission of a pulse signal to immediately before the next pulse signal is transmitted is referred to as one sweep. The period of time in one sweep, in other words, an average transmission cycle (average transmission interval) is 1 ms, for example. The number of reception data per one sweep is referred to as a sampled number.

The radar antenna 20 may discharge the pulse signals while focusing in a certain direction, and receives reception signals including reflection wave(s) from the target object (target object signal element). The reception signals may also include elements, such as clutter, an interference wave caused by a radio wave from another radar apparatus, and noise of a receiver, in addition to such target object signal element.

A distance from the radar antenna 20 to the target object is obtained based on a time difference between a reception timing of the reception signal including the target object signal element and a transmission timing of the pulse signal corresponding to the reception signal. The azimuth of the target object is obtained based on the azimuth of the radar antenna 20 when transmitting the corresponding pulse signal. The speed of the target object is obtained by using the phase of the received pulse signal.

The transception switch 25 is connectable with the radar antenna 20. The transception switch 25 switches the transmission destination of the signal therefrom between the radar antenna 20 and the transception device 30 so that the pulse signal does not stray into the reception circuit during the transmission processing and the reception signal does not stray into the transmission circuit during reception processing. An electric component such as a circulator is used as the transception switch 25.

[Configuration of Transception Device 30]

The transception device 30 generates the pulse signal and transmits it to the radar antenna 20. The transception device 30 fetches the reception signal from the radar antenna 20 and performs a frequency conversion on the reception signal. To perform the processing, the transception device 30 includes a transmission signal generator, a transmitter, a local oscillator, and a frequency converter.

The transmission signal generator generates a pulse signal at an intermediate frequency and outputs it to the transmitter at different timing intervals set in the staggered trigger scheme. The pulse signal generated by the transmission signal generator may be any one of a frequency-modulated chirp signal, a phase-modulated signal, and a non-modulated pulse signal. The transmission interval and the pulse width of the pulse signal generated by the transmission signal generator are changed according to a display distance range of the radar image which is set by the display device 50.

The transmitter combines the output signal of the transmission signal generator with a local signal outputted from the local oscillator, converts the frequency of the outputted pulse signal from the transmission signal generator, and outputs it to the transception switch 25. With the ship radar apparatus, the frequency band of the output signal of the transmitter is normally the 3 GHz band or the 9 GHz band.

The frequency converter fetches the reception signal outputted from the radar antenna 20 via the transception switch 25. The frequency converter combines the reception signal with the local signal outputted from the local oscillator, converts the output signal of the transception switch 25 into an intermediate frequency, and outputs it to a signal processing device 40 for later processing.

[Configuration of Signal Processing Device 40]

The signal processing device 40 includes an analog/digital converter (ADC) 41, a detector 42, a phase calculator 43, a ship speed corrector 44, and a Doppler processor 45. The signal processing device 40 performs a quadrature detection at the transception device 30, converts the signal into a digital signal at the ADC 41 and performs signal processing, such as removal of clutter by Doppler processing. The processed reception data is outputted to the display device 50. An operator of the radar apparatus 10 can confirm the azimuth and the distance of the target object based on the position of an image element of the target object that is displayed in the radar image of the display device 50 based on an amplitude of the reflection wave (echo signal) from the target object. Normally, the radar image is displayed in a bird's eye view manner centering a position of the radar apparatus 10 (radar antenna 20). The display origin corresponds to the position of the radar apparatus 10.

[ADC 41]

The ADC 41 samples the reception signal outputted from the transception device 30 at a predetermined sampling frequency and converts it into the digital signal. Normally, the radar reception signal obtained on one scan corresponding to one antenna rotation (360 degrees) has information of azimuth and distance. When the number of sweeps in one scan is K and the first sweep serves as a reference (0 degree), the radar reception signal obtained in the k-th sweep is obtained from a reflective body in an azimuth of (k/K)×360 (degrees) (0≤k≤K−1). The data obtained from the same azimuth corresponds to the same azimuth number. For example, the reception data obtained in the k-th sweep is given an azimuth number k.

When the sampled number per one sweep is N and the range (maximum display distance from the radar antenna 20) is L, the reception data obtained in the n-th sampling in each sweep is data obtained from the reflective body at a distance of (n/N)×L(0≤n≤N−1). Such reception data obtained in the n-th sampling is given a distance number n.

[Detector 42]

The detector 42 performs the quadrature detection on the reception signal to generate an I (In-phase) signal and a Q (Quadrature) signal of which the phase is different therefrom by π/2. Here, the I signal and the Q signal are a real component and an imaginary component of a complex envelope signal of the radar reception signal. The quadrature detection may be performed before or after the processing at the ADC 41.

[Phase Calculator 43]

The phase calculator 43 acquires a ground speed $V_G$ of the ship with reference to a water bottom, a heading $\theta_{HD}$ that is an azimuth to which the bow of the ship is oriented with reference to North, a traveling azimuth $\theta_{CS}$ that is a direction to which the ship is traveling with reference to North, an antenna azimuth angle $\theta_{ANT}$ that is an azimuth to which a main lobe of the radar antenna 20 is oriented with reference to the heading $\theta_{HD}$, the transmission interval at which the pulse signal is repeatedly transmitted, and a repetition frequency f (or wavelength λ) of the pulse signal. The ground speed $V_G$, the heading $\theta_{HD}$, and the traveling azimuth $\theta_{CS}$ are measured by a measuring device, such as a GPS (Global Positioning System), a gyro compass, or a satellite compass, equipped in the ship.

[Ship Speed Corrector 44]

The ship speed corrector 44 receives the complex reception signals I and Q from the detector 42, and a phase rotator $\exp(\theta_k')$ from the phase calculator 43. The ship speed corrector 44 performs a complex multiplication in which the complex reception signals I and Q are multiplied by the phase rotator $\exp(\theta_k')$. Thereby, the phases of the complex reception signals can be rotated by a phase correction value $\theta_w$. The corrected complex reception signals I' and Q' obtained by multiplying the complex reception signals I and Q by the phase rotator $\exp(\theta_k')$ are outputted to the Doppler processor 45.

[Doppler Processor 45]

Figure 5:
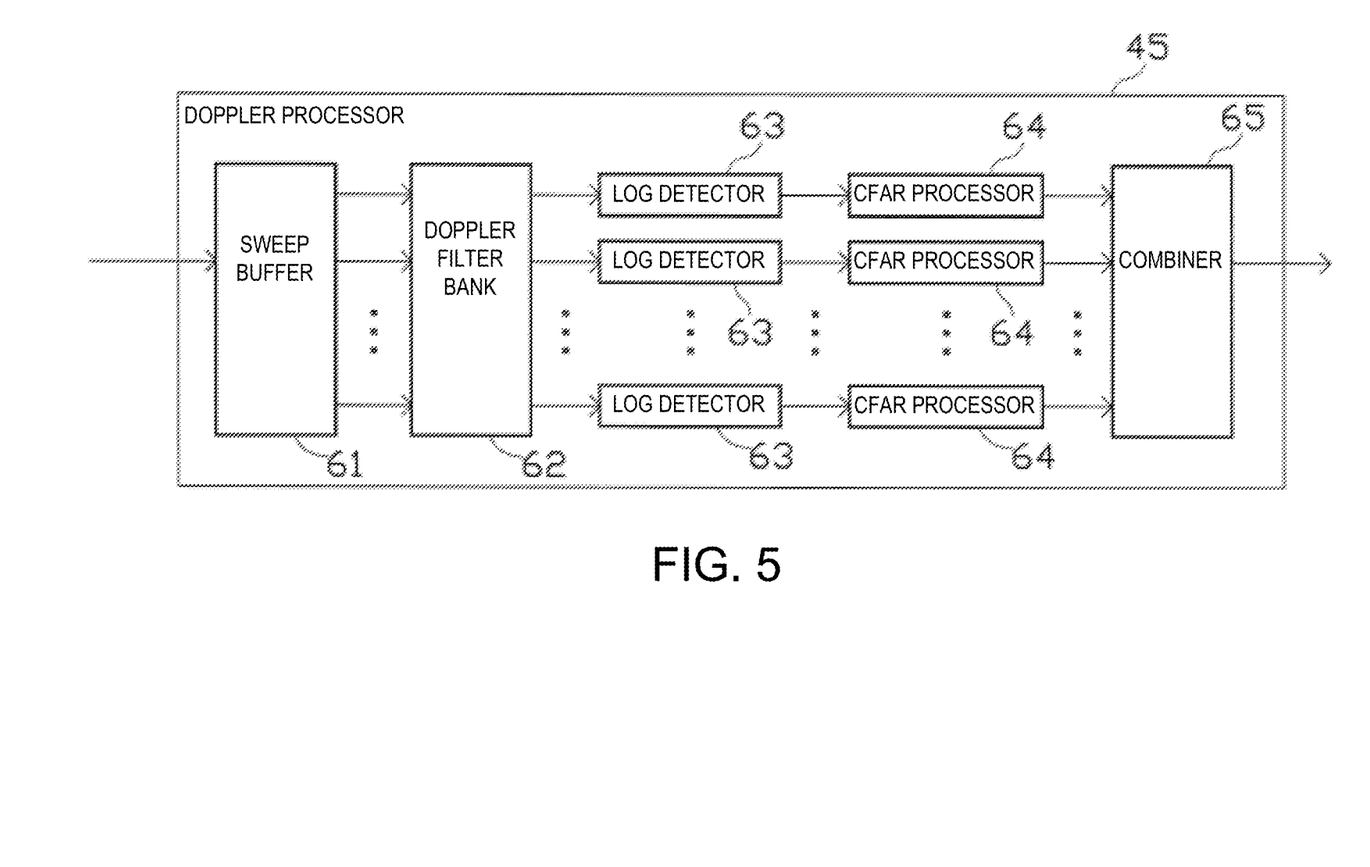
FIG. 5 is a block diagram showing one example of a configuration of a Doppler processor.

The Doppler processor 45 receives the outputs I' and Q' of the ship speed corrector 44 and performs the Doppler processing and adjunct processing thereto. The Doppler processor 45 includes, as shown in FIG. 5, a sweep buffer 61, a Doppler filter band 62, a plurality of log detectors 63, a plurality of CFAR processors 64, and a combiner 65. The sweep buffer 61 is a memory for storing the complex reception signals I' and Q' outputted from the ship speed corrector 44, and stores the reception data for a plurality of sweeps.

The Doppler filter bank 62 is a filter array configured by parallelly connecting a plurality of band pass filters having different center frequencies of a passband from each other together. Each of the center frequencies is a Doppler shifted frequency.

The plurality of log detectors 63 for detecting a log of an output of each filter of the Doppler filter bank 62 are connected with the Doppler filter bank 62 for later processing. Each log detector 63 is connected with one CFAR (Constant False Alarm Rate) processor 64. Each CFAR processor 64 performs CFAR processing in a distance direction on the output signals of the connected log detectors 63.

The combiner 65 combines the output signals of all the CFAR processors 64 together about every distance in an azimuth about which the processing is performed. Here, the combiner 65 combines the outputs signals of all the CFAR processors 64 by max processing. An amplitude value of the output signal (combined output signals) of the combiner 65 in the azimuth about which the processing is performed matches with a highest amplitude value in all the CFAR processors 64 at each distance. The max processing can be performed by using a highest value selector for selecting an output at the highest level among a plurality of outputs, for example.

(3) Operation of Radar Apparatus

Figure 6:
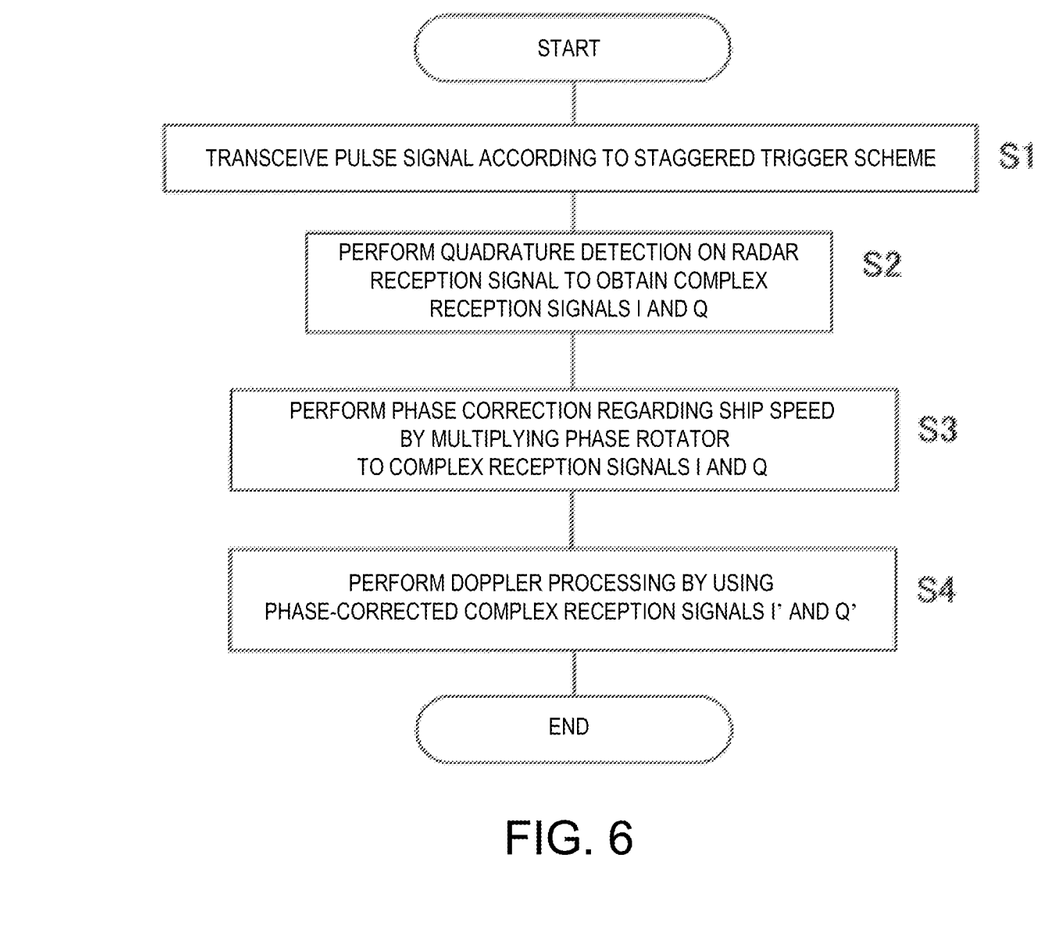
FIG. 6 is a flowchart showing an operation of the radar apparatus shown in FIG. 3.

Next, the operation of the radar apparatus 10 is described along a flowchart shown in FIG. 6, with a focus on an operation of the phase correction in the radar apparatus 10.

The transception device 30 transmits the pulse signal at the transmission interval which is set by the stagger processing, and receives the echo signal(s) from the target object (S1). The radar antenna 20 transceives the pulse signal while rotating to change its azimuth by k/K×360 degrees in every sweep.

Due to the transception of the pulse signal at the radar antenna 20, the echo signal is outputted from the transception device 30 to the signal processing device 40. In the signal processing device 40, the ADC 41 converts the echo signal into the digitalized reception data, the detector 42 performs the quadrature detection thereon to create the complex reception signals I and Q, and the complex reception signals I and Q are outputted to the ship speed corrector 44 (S2).

Meanwhile, the phase calculator 43 of the signal processing device 40 acquires data regarding the ground speed $V_G$, the heading $\theta_{HD}$, and the traveling azimuth $\theta_{CS}$ which are obtained based on the data inputted from, for example, the GPS, and information of the antenna azimuth angle $\theta_{ANT}$ of the radar antenna, the transmission interval, and the wavelength λ, (frequency f) of the transmission signal, so as to calculate the phase change amount (phase correction value $\theta_k$). According to this embodiment, the antenna azimuth angle $\theta_{ANT}$ corresponds to the azimuth in which the antenna 20 is oriented. Normally, a pulse number of a stepping motor for rotating the radar antenna 20 and an output signal of an angle detection device are outputted to the signal processing device 40 from the radar antenna 20. The phase calculator 43 detects the antenna azimuth angle $\theta_{ANT}$ based on the information. The transmission interval and the wavelength λ, are contained in the data outputted from the transception device 30 to the signal processing device 40. The calculated phase correction value $\theta_k$ is applied on the complex reception signals I and Q which is outputted from the detector 42, by the phase rotator for correction.

Figure 4:
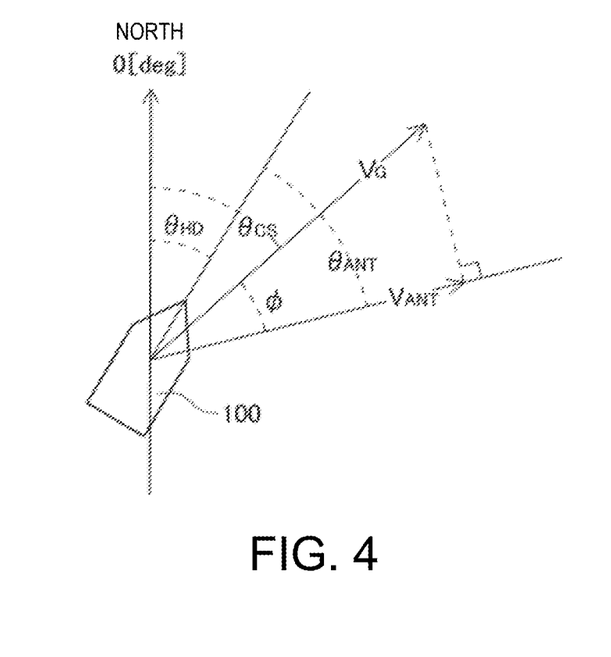

Here, the phase correction value $\theta_k$ is calculated based on a relation among a speed element $V_{ANT}$ of the ship in the antenna azimuth and the antenna azimuth angle $\theta_{ANT}$, the ground speed $V_G$, the heading $\theta_{HD}$, and the traveling azimuth $\theta_{CS}$.

FIG. 4 is a schematic view showing a relation among a speed element $V_{ANT}$ of the ship in the antenna azimuth and the antenna azimuth angle $\theta_{ANT}$, the ground speed $V_G$, the heading $\theta_{HD}$, the traveling azimuth $\theta_{CS}$. In FIG. 4, the relative angle ø is an angle between the traveling azimuth of the ship 100 and the antenna azimuth, and is given based on the following equation: $ø=\theta_{ANT}+\theta_{HD}-\theta_{CS}$.

By using this relative angle ø, the speed element $V_{ANT}$ is given based on the following equation: $V_{ANT}=V_G \times \cos(ø)$.

The phase correction value $\theta_{k'}$, for the sweep number k' corresponding to the sweep where the transmission interval is changed by the stagger processing is given based on the following equation (1).

$$\theta_{k'} = 2\pi \cdot \frac{2V_{ANT}}{\lambda} \cdot t_{k'} \quad (1)$$

Here, $t_{k'}$ is a period of time of each sweep from a reference value (sweep number).

When referring to the previous sweep, the phase correction value $\theta_{k'+1}$ can be obtained by adding the phase that is calculated based on the period of time from the previous sweep to the current sweep. In this case, the phase correction value $\theta_{k+1}$ is given based on the following equation (2).

$$\theta_{k'+1} = \theta_{k'} + 2\pi \cdot \frac{2V_{ANT}}{\lambda} \cdot (t_{k+1} - t_{k'}) \quad (2)$$

The ship speed corrector 44 performs the phase correction regarding the ship speed by multiplying the complex reception signals I and Q by the phase rotator, which is given by the phase calculator 43, and the ship speed corrector 44 outputs the corrected complex reception signals I' and Q'. In other words, the ship speed corrector 44 (phase corrector) multiplies the complex reception signals by the phase correction value $\theta_{k'}$ calculated by the phase calculator 43 (performs the correction based on the phase change amount on the complex reception signals), and the ship speed corrector 44 outputs the corrected complex reception signals I' and Q' (S3).

The Doppler processor 45 performs the Doppler processing by using the corrected complex reception signals I' and Q' outputted from the ship speed corrector 44 (S4). In the Doppler processing, the complex reception signals I' and Q' after the phase correction are used.

Even when the staggered trigger scheme is adopted and the transception of the pulse signal is repeated at an unequal interval, by performing the processing at S3, the phase difference error caused in relation to the phase change amount due to the ship speed can be removed.

Figure 7:
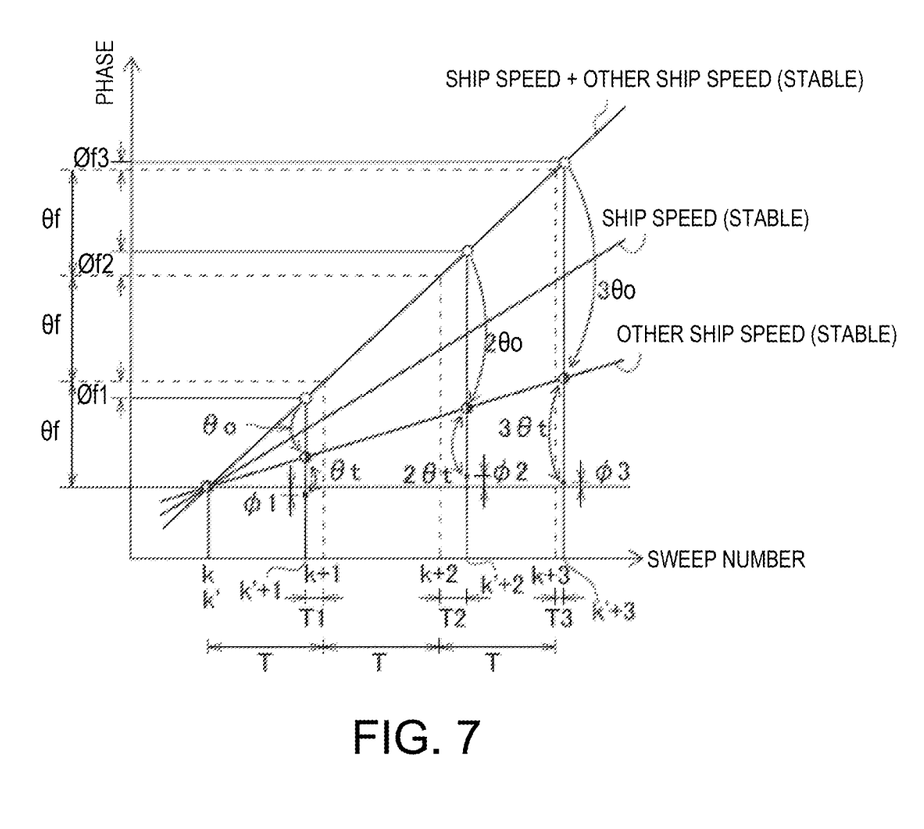
FIG. 7 is a chart for describing a reduction of the influence of the stagger processing on the Doppler processing.

This effect is described in detail with reference to FIG. 7.

The relative speed of another ship, which becomes the target object in this embodiment when seen from the ship, with respect to the ship is given by adding the ground speed of the ship (ship speed) to the ground speed of the other ship (other-ship speed). In FIG. 7, the line with the largest inclination corresponds to the summation of the ship speed and the other-ship speed. Here, for the sake of convenience, the summation of the ship speed and the other-ship speed is fixed and each of the ship speed and the other-ship speed is fixed.

The changes of the phases by the summation of the ship speed and the other-ship speed at the speed numbers k', k'+1, k'+2 and k'+3 are indicated by the white circles. In FIG. 7, the dotted line is drawn at a sweep interval when the transmission interval is equal, and in this example, it is drawn at a position corresponding each of the sweep numbers k, k+1, k+2 and k+3 in FIG. 6.

In the case with the relative speed, in the sweep corresponding to the sweep number k'+1, since the processing is required on the phase change amounts θo+θt obtained by adding the phase change amount θo due to the ground speed of the ship, to the phase change amount θt due to the ground speed of the other ship, the phase error øf1 naturally becomes large accordingly. Whereas, when only the other-ship speed is used, in the sweep corresponding to the sweep number k'+1, since the processing is performed only on the phase change amount θt due to the other-ship speed, the phase error ø1 becomes small accordingly. In this manner, in the Doppler processing in the radar apparatus 10 that has adopted the staggered trigger scheme, the interruption of the improvements of the S/C and S/N due to the interval of the transception of the pulse signal being unequal between sweeps can be reduced.

Meanwhile, when the traveling direction of the ship is the same as the other ship, by subtracting the ship speed, an absolute value of the relative speed may be higher contrary to the above description. However, normally, the relative speed when the traveling direction of the ship is different from the other ship is faster than the relative speed when the traveling direction is the same. By subtracting the ship speed, the absolute value of the relative speed becomes slightly larger, as well as the phase error. However, compared to this effect, the effect that the phase error becomes smaller by subtracting the ship speed is stronger. Thus, as a whole, the maximum value of the phase error caused by the stagger processing can surely be reduced. As a result, by subtracting the ship speed, the interruption of the improvements of the S/C and the S/N can be reduced.

When the moving speed of the antenna is used as the ship speed, the conventional equipment for measuring the ship speed can be used as it is, and the configuration of the system can be simplified. When the speed element of the antenna azimuth angle $\theta_{ANT}$ is used for the moving speed of the antenna, the present invention can also be applied to a system including an antenna that rotates as the radar antenna 20, and the application of the present invention spreads.

The above description is based on a condition that the summation of the ship speed and the other-ship speed is fixed and the ship speed and other-ship speed are fixed. Even when the relative speed changes momentarily, since the inclination of FIG. 7 changes corresponding to the relative speed, the phase change amount with respect to a reference phase can be calculated based on the corresponding inclination.

<Modification 1>

With the radar apparatus 10 of FIG. 3, the case where the image processing such that the Doppler-processed data is transmitted to the display device 50 and the image is displayed is described. However, the Doppler-processed data may be used in processing related to a different kind of speed, and is not limited to be used in the image processing.

<Modification 2>

With the radar apparatus 10 of the above embodiment, the case where the radar antenna 20 rotates in the horizontal plane is described. However, the antenna is not limited to the one that rotates, and may be a static antenna. In this case, the moving direction of the antenna and the antenna azimuth are fixed, in such case, a fixed value may be always used as the antenna azimuth angle.

<Modification 3>

The radar antenna 10 of this embodiment is a radar apparatus equipped in a ship; however, the present invention is not limited to the ship radar apparatus, and may be applied to a radar apparatus for other applications, such as a radar apparatus equipped in an automobile or an aircraft.

<Modification 4>

In this embodiment, the signal processing device 40 as the Doppler processing device is described; however, a Doppler processing device is only necessary to include components regarding the phase calculator 43, the ship speed corrector 44, and the Doppler processor 45.

<Modification 5>

In the above embodiment, the case is described, where the function blocks of the signal processing device 40 are achieved in a manner that the CPU interprets and executes the program data that can execute the above-described processing procedure stored in the memory device (e.g., ROM, RAM, and hard disk). The program data may be introduced into the memory device via a memory device, or may directly be executed on the memory medium. The memory medium includes a semiconductor memory (e.g., ROM, RAM, and flash memory), a magnetic disk memory (e.g., flexible disk and hard disk), an optical disk memory (e.g., CD-ROM, DVD, and BD), and a memory card. Moreover, the concept of the memory medium includes a communication medium (e.g., telephone line and carrier path).

All or a part of the function blocks configuring the signal processing device 40 of this embodiment are typically achieved as an LSI (referred to as, for example, IC, system LSI, super LSI, or ultra LSI, depending on integration degree) which is an integrated circuit. These may be individually configured as one chip, or a part of all of the function blocks may be configured as one chip. The method of the integration is not limited to be the LSI, and may be achieved with a dedicated circuit or a general purpose processor. An FPGA (Field Programmable Gate Array) that can be programmed after manufacturing the LSI, or a reconfigurable processor that can reconfigure the connection and setting of the circuit cells inside the LSI may be used.

<Modification 6>

In this embodiment, the case where the ship speed and the other-ship speed are fixed is described; however, the effects described above can also be exerted with the configuration of the above embodiment even in a case where the ship speed and the other-ship speed are not fixed.

<Modification 7>

In this embodiment, the case where the Doppler device and the radar apparatus are equipped in a ship is described; however, the Doppler device or the radar apparatus is not limited to be equipped in a ship, and may be equipped in a different kind of movable body. Specific examples of the different kind of movable body include a bicycle, a motorcycle, an automobile, a train, and an aircraft.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A signal processing device, comprising:
   an echo signal input unit configured to receive echo signals resulted from transmission signals reflected on an object, the transmission signals transmitted from a transmission source at transmission timings at predetermined time intervals, at least one of the transmission timings shifted from the other timings in time;
   a complex reception signal generator configured to generate complex reception signals based on the echo signals by performing quadrature detection on the echo signals;
   a phase calculator configured to calculate a phase change amount of the complex reception signals with respect to a reference phase based on a moving speed of the transmission source and a lapsed period of time from a reference timing;
   a phase corrector configured to correct a phase of the complex reception signals based on the phase change amount and to output the corrected complex reception signals; and
   a Doppler processor configured to perform Doppler processing on the corrected complex reception signals and to output the Doppler-processed complex reception signals as Doppler echo signals of the object.

2. The signal processing device of claim 1, wherein the phase calculator is further configured to receive the moving speed of the transmission source at the transmission timing of the transmission signal corresponding to the complex reception signals.

3. The signal processing device of claim 2, wherein the phase calculator is further configured to receive a ground speed and a moving direction of the transmission source, and to calculate a moving speed component of the transmission source in an antenna facing direction by using the received ground speed and the moving direction, and output the moving speed component of the transmission source in the antenna facing direction to the phase calculator.

4. The signal processing device of claim 1, wherein the phase corrector is further configured to receive a phase rotator ($\theta k$) for rotating the complex reception signals by a phase amount corresponding to the phase change amount.

5. The signal processing device of claim 1, wherein the Doppler processor includes:
   a Doppler filter bank where a plurality of band pass filters having different center frequencies of a passband from each other are connected in parallel to each other as an array;
   a plurality of log detectors configured to detect logs of the complex reception signals outputted from the plurality of band pass filters of the Doppler filter bank, respectively;
   a plurality of CFAR processors configured to perform constant false alarm rate processing on the output signals of the log detectors in a distance direction, respectively; and
   a combiner configured to combine the output signals of the CFAR processors together for each distance in the distance direction.

6. The signal processing device of claim 3, wherein the phase calculator is further configured to calculate the phase change amount based on a relative speed of the object with respect to the transmission source.

7. A radar apparatus, comprising:
- an antenna configured to transmit transmission signals at transmission timings at predetermined time intervals and to sequentially receive echo signals resulted from the transmission signals reflected on an object, at least one of the transmission timings shifted from the other timings in time;
- a complex reception signal generator configured to generate complex reception signals based on the echo signals by performing quadrature detection on the echo signals;
- a phase calculator configured to calculate a phase change amount of the complex reception signals with respect to a reference phase based on a moving speed of the antenna and a lapsed period of time from a reference timing;
- a phase corrector configured to correct a phase of the complex reception signals based on the phase change amount and to output the corrected complex reception signals; and
- a Doppler processor configured to perform Doppler processing on the corrected complex reception signals and to output the Doppler-processed complex reception signals as Doppler echo signals of the object.

8. The radar apparatus of claim 7, wherein the phase calculator is further configured to receive the moving speed of the antenna at the transmission timing of the transmission signal corresponding to the complex reception signals.

9. The radar apparatus of claim 8, wherein the phase calculator is further configured to receive a ground speed and a moving direction of the antenna, and to calculate a moving speed component of the antenna in a transmission source-facing direction by using the received ground speed and the moving direction, and output the moving speed component of the antenna in the transmission source-facing direction to the phase calculator.

10. The radar apparatus of claim 9, wherein the phase calculator is further configured to calculate the moving speed based on information on a position measured by a GPS installed near the antenna.

11. The radar apparatus of claim 7, wherein the phase corrector is further configured to receive a phase rotator ($\theta k$) for rotating the complex reception signals by a phase amount corresponding to the phase change amount.

12. The radar apparatus of claim 7, wherein the Doppler processor includes:
- a Doppler filter bank where a plurality of band pass filters having different center frequencies of a passband from each other are connected in parallel to each other as an array;
- a plurality of log detectors configured to detect logs of the complex reception signals outputted from the plurality of band pass filters of the Doppler filter bank, respectively;
- a plurality of CFAR processors configured to perform constant false alarm rate processing on the output signals of the log detectors in a distance direction, respectively; and
- a combiner configured to combine the output signals of the CFAR processors together for each distance in the distance direction.

13. The radar apparatus of claim 9, wherein the phase calculator is further configured to calculate the phase change amount based on a relative speed of the object with respect to the antenna.

14. The radar apparatus of claim 7, further comprising a display unit configured to display the object based on the Doppler echo signals.

15. A method of detecting an object, comprising:
- transmitting, via a transmitter operatively coupled to a signal processing device with a processor, transmission signals at timings at predetermined time intervals, at least one of the timings shifted from the other timings in time;
- sequentially receiving, via the receiver operatively coupled to the transmitter and to the signal processing device, echo signals resulted from the transmission signals reflected on the object;
- generating, via the signal processing device, complex reception signals based on the echo signals by performing quadrature detection on the echo signals;
- storing the complex reception signals into a memory in the signal processing device:
- calculating, via the signal processing device, a phase change amount of the complex reception signals with respect to a reference phase based on a moving speed of a transmission source and a lapsed period of time from a reference timing;
- correcting, via the signal processing device, a phase of the complex reception signals based on the phase change amount and outputting the corrected complex reception signals; and
- performing, via the signal processing device, Doppler processing on the corrected complex reception signals and outputting on a display device the Doppler-processed complex reception signals as Doppler echo signals of the object.

16. The object detecting method of claim 15, further comprising inputting the moving speed of the transmission source at the transmission timing of the transmission signal corresponding to the complex reception signals.

17. The object detecting method of claim 16, comprising receiving a ground speed and a moving direction of the transmission source, calculating the moving speed in an azimuth where the object exists by using the received ground speed and the moving direction, and outputting the calculated moving speed.

18. The object detecting method of claim 15, wherein the Doppler processing includes:
- passing the complex reception signals through a filter array where a plurality of band pass filters having different center frequencies of a passband from each other are connected in parallel to each other;
- detecting logs of the complex reception signals outputted from the plurality of band pass filters of the filter array, respectively;
- performing constant false alarm rate (CFAR) processing on the detected signals in a distance direction, respectively; and
- combining the CFAR-processed signals together for each distance in the distance direction.

19. The object detecting method of claim 15, further comprising calculating the phase change amount based on a relative speed of the object with respect to the transmission source.

* * * * *